Figure 1:
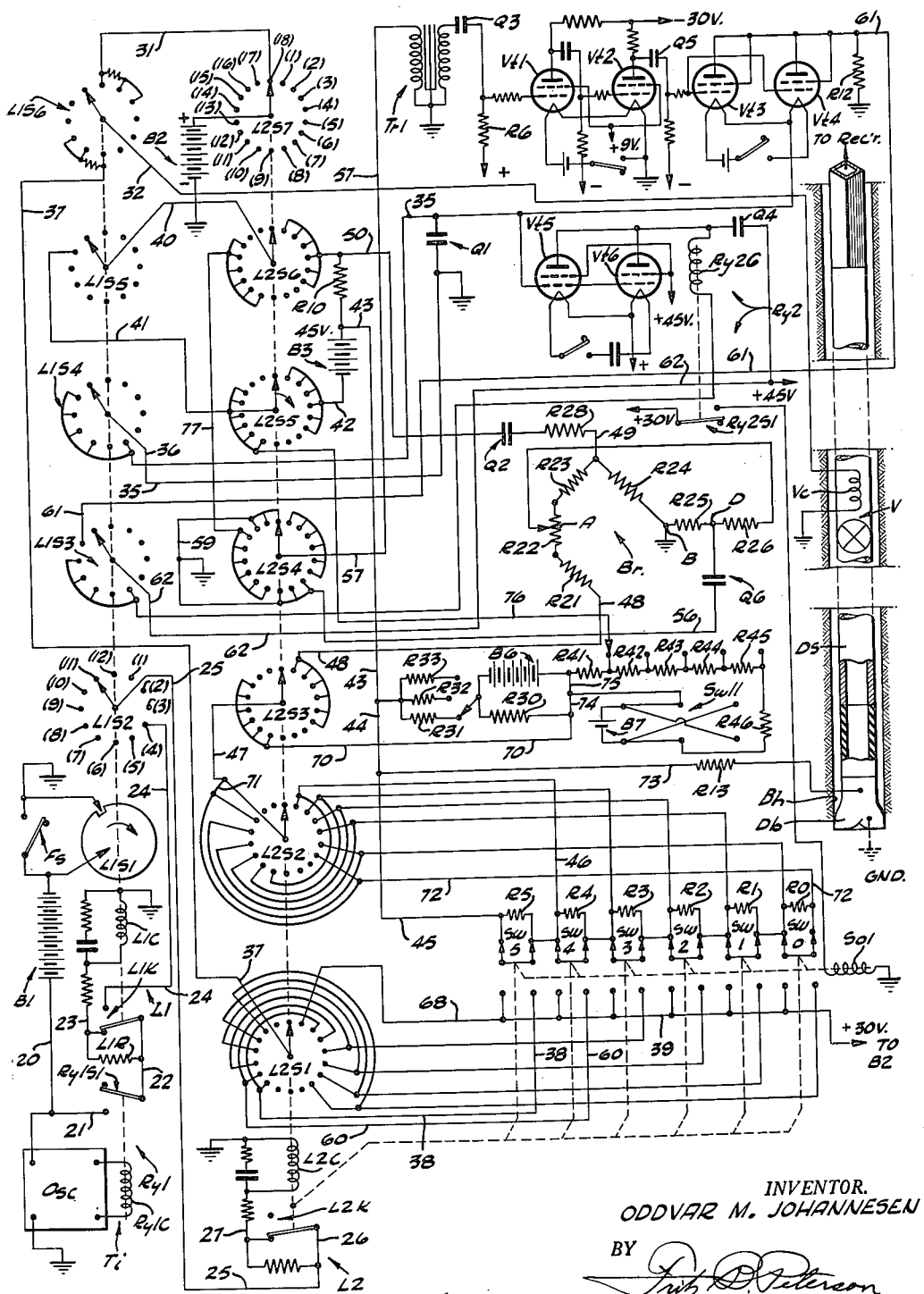

INVENTOR.
ODDVAR M. JOHANNESEN
BY
AGENT

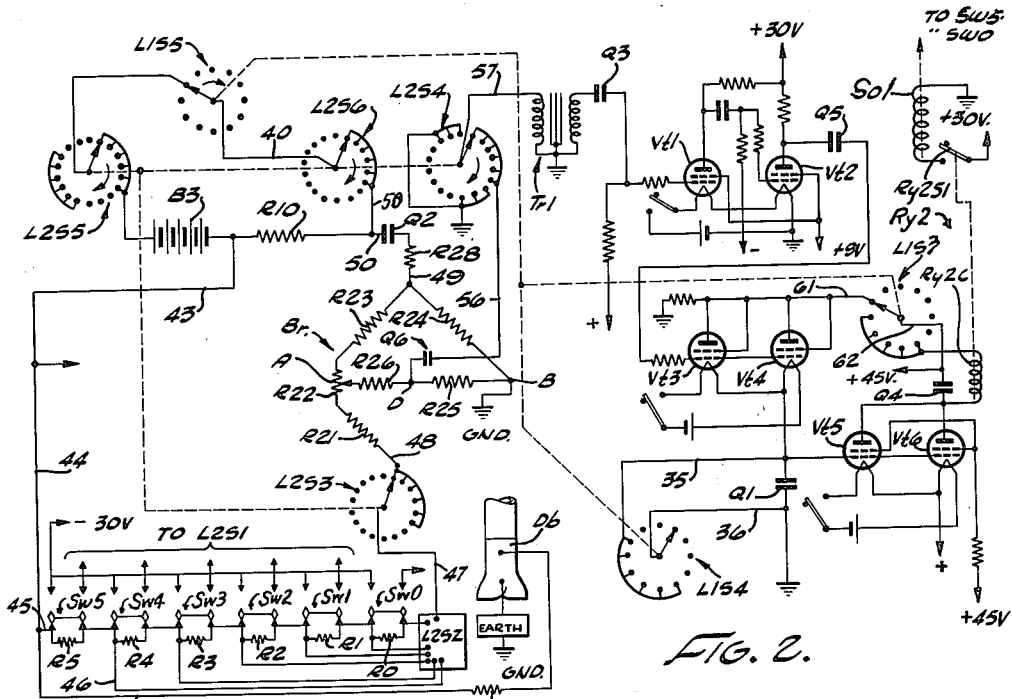

United States Patent Office 2,973,505
Patented Feb. 28, 1961

2,973,505

METHOD AND APPARATUS FOR EARTH BOREHOLE INVESTIGATING AND SIGNALING

Oddvar M. Johannesen, Arcadia, Calif., assignor, by mesne assignments, to Dresser Industries, Inc., Dallas, Tex., a corporation of Delaware Filed Oct. 18, 1954, Ser. No. 462,718

6 Claims. (Cl. 340—18)

This invention relates to improvements in apparatus employed in investigations conducted at one or more inaccessible locations in earth boreholes such as oil wells; and more specifically is directed to improvements in apparatus employed, either during suspension of drilling or during drilling of a borehole, in measuring at such a location any of a plurality of physical variables or quantities, and in encoding numbers representing values of the measured variables, and the formulation and transmission of one or more signals representing the encoded numbers. Such signals are capable of being transmitted from the inaccessible location of the investigation within the borehole, to a convenient accessible point outside the borehole, usually at the surface of the earth, for detection, decoding and analysis of the information thus obtained. In a still more specific aspect, the present invention relates to improvements in apparatus for measuring at an inaccessible location, electrical quantities by comparison methods; as, for example, by bridge and potentiometer methods.

In certain respects the present invention relates to and presents improvements upon an invention disclosed in an application filed on even date herewith by Robert Lee Alder, Serial No. 462,724, now Patent No. 2,901,685, issued August 25, 1959. Also, in certain respects the present invention relates to and presents improvements upon an invention disclosed in an application filed on even date herewith by Robert J. Dwyer, Serial No. 462,917.

It is well known in the electrical and allied arts to employ a Wheatstone bridge network in measuring an unknown electrical quantity. For example, in measuring electrical resistance this is usually done by passing an electric current through a network of resistances including the resistance of unknown value and varying one of the other resistances of known value by known increments or steps until the potential between certain points of the network falls to zero value, whereupon, by application of Ohm's law and the values of the known resistances, the unknown value of resistance may be computed. The present invention provides a novel apparatus and a new mode for measuring unknown values of resistance and other physical or electrical quantities, automatically and at inaccessible locations, with a great saving in power as compared to previous apparatus and modes of the mentioned character. In many instances in which it is desired to obtain measurements of the types hereinabove indicated, the problem of an adequate and economical power supply becomes acute, due to the distance between the measuring apparatus and operating personnel, excessive heat, vibration and lack of space at the measuring location, and other factors. This is especially true in the case of earth borehole investigations, wherein the permissible space in the borehole for the investigating apparatus is severely restricted, and the ambient temperatures are often very high. The problem is even more acute in the case of apparatus employed in investigations conducted in the vicinity of the bottom of a deep earth borehole, such as an oil well, during drilling of the hole. In the latter type of operation it is impractical to employ electric conductors to convey electric power to the measuring apparatus at the bottom of the borehole; and resort is had to compact electric batteries contained in the investigating apparatus in the lower end portion of the drill string adjacent the bottom of the borehole. These batteries, due to their having to be specially constructed to operate under the adverse conditions of extreme heat and vibration encountered in the drilling apparatus, are very expensive, yet of relatively short effective life. With these facts in view, it is an important object of the present invention to provide improvements in apparatus of the class hereinabove mentioned, which will effect considerable savings in the power required for operation.

Another object of the invention is to provide improvements in earth borehole investigation apparatus.

Another object of the invention is to provide an efficient automatically acting apparatus for logging information at a relatively inaccessible location in an earth borehole during drilling thereof.

Another object of the invention is to provide in an earth borehole logging system a means for measuring the unknown value of a physical quantity and encoding a number representing the measured value, formulating a signal representing the encoded number, and transmitting the signal, concurrently with the measuring operation. Encoding of the number permits much greater accuracy and efficiency in the operation of the system than is attained by other logging systems.

Another object of the invention is to provide a borehole investigating and signaling system of very low power requirements and capable of operation during continued drilling of the borehole.

Another object of the invention is to provide an apparatus for use at an inaccessible location in an earth borehole for measuring by comparison an unknown value of an electrical quantity, using but a very small amount of electric power.

The above and other important objects and advantages of the invention in its several aspects will become apparent from a thorough consideration of the following description and explanation of the operation of a preferred embodiment of apparatus illustrating a system according to the invention, in connection with the accompanying drawings diagrammatically depicting said apparatus. In the drawings:

Fig. 1 is a schematic drawing principally in the form of a circuit diagram of the electrical connections of electrical components of apparatus of the exemplary embodiment according to the invention, and indicating the environment of the apparatus in operation;

Fig. 2 is a schematic drawing depicting in simplified form and arrangement the circuitry of portions of the apparatus of Fig. 1 at a period of its operation devoted to measurement and coded signaling of an unknown value of electrical resistance; and Fig. 3 is a simplified schematic drawing similar to Fig. 2 but depicting the circuitry of portions of the apparatus of Fig. 1 at a different period of operation, devoted to measurement and coded signaling of an unknown value of electrical potential.

Referring to the drawings, a preferred form of system according to the invention is illustrated in connection with apparatus employed in drilling an earth borehole; and more specifically is illustrated as a system adapted for obtaining within a drill collar adjacent a drill bit at an inaccessible location in a borehole, either during drilling or during periods of suspension of drilling, measurements of the unknown resistance of an earth-path and of the earth's natural potential (N.P.) thereadjacent; and for encoding numbers respectively representing each of the measurements and formulating and transmitting plural-element signals representing the encoded numbers.

Such measurements are of value in electrically "logging" earth boreholes. The purpose of encoding the number representing the measured value in each instance, is to facilitate transmission of the data or information by signals to an accessible point outside the borehole and to enhance the accuracy and speed of the signaling, the encoding permitting easy and precise transmission of any of a wide range of numerical values with a minimum number of signal elements in a single value-representing signal. The number to be encoded may be either the actual numerical value of the measure of the physical quantity being investigated, or may be that value plus or minus a predetermined amount or number, or the like, according to the arrangement, nature and values of the elements of the apparatus; but the encoded number is such that it accurately represents the numerical value of the measure of the quantity; and the apparatus is such that when a signal is formulated from the encoded number, transmitted, received and translated, the translation will yield precisely such number. From the translation an accurate determination of the original measure is then readily effected.

The plural-element signal representing an encoded number representing a value or measure is according to the invention preferably but not necessarily formed in the nature of a series of time-spaced signal-elements each selected from signal-elements of two types or characters. For example, the two types of signal-elements may be, respectively: (1) a current pulse, and (2) absence of a current pulse, in which case the signal may be composed of a series of time-spaced current pulses and/or absences of a current pulse. The nature of this signal and its formation, and of a second type of signal employed for transmitter-receiver synchronization purposes, are hereinafter more fully explained. The signal preferably includes elements in number equal to the number of code symbols required to encode the number representing the measure of the unknown value, for reasons hereinafter made apparent. The encoding is effected in accordance with a known mathematical system of number representation, and is preferably but not necessarily effected or performed in accord with the binary system of number representation, for reasons hereinafter made fully apparent.

The apparatus of the invention required at the inaccessible location in a borehole is principally housed in a suitable container (not shown) situated and mounted in a lower section of the drill string, as for example, in a drill collar. Being composed principally of well known electrical units such as switches, relays, batteries, electron tubes, capacitors, resistors, conductors and the like, of each of which there is a wide selection of commercially available models, the apparatus of the disclosed embodiment of the invention is only schematically illustrated. It will be understood that the various circuit elements may be widely varied in form and style within the concept of the invention, their selection being largely dependent upon the particular environment in which the physical apparatus is to be used. The container and its mounting may be of any suitable design and such as are known in the art.

Referring to Fig. 1, a typical earth borehole $Bh$ is indicated as in the process of being drilled in the earth by drilling means including a drill string $Ds$ having a drill bit $Db$ at its lower end. With the exception of the apparatus of the invention housed in the aforementioned container in the lower section of the drill string, the drilling means may be of any suitable type and may be of the well known type employed in rotary drilling. Since the drilling means per se are well known, they are not fully illustrated in the drawings. The apparatus housed in the container (not shown) in a lower section of the drill string, is shown in diagrammatic form outside the borehole in Fig. 1, but it will be understood that the physical apparatus itself is contained within the confines of the drill string. The apparatus thus diagrammatically depicted includes a principal battery B1 which is employed to furnish the power for the principal moving parts of the apparatus, including a timer $Ti$ which governs timing of the operation of the apparatus. The timer is devised to provide periodic pulses of power or current from battery B1 to the magnet or motor coil L1C of a rotary stepping switch assembly indicated generally by ordinal L1 and employed to effect switching and other governing operations of portions of the apparatus. Switch assembly L1 is thereby stepped by the pulses of power from station to station at regular intervals which may be, for example, one second each in duration. Stepping switch assembly L1 comprises in addition to its stepping motor mechanism, a series of superposed and coaxial, rotary, multicontact switches, L1S1, L1S2, L1S3, L1S4, L1S5 and L1S6, all of which are stepped substantially in synchronism from one contact or station to the next each time the motor coil receives an actuating current pulse. Each of the several switches L1S1, L1S2, etc., comprises a sweep contact on an insulated sweep contact arm which is secured to and insulated from a shaft rotated stepwise by the motor, and a circularly disposed series of stationary peripheral contacts on a wafer-type mount, whereby the sweep contact at each step breaks contact with one peripheral contact or station and makes contact with the next contact or station. The shaft or mechanical driving interconnection of the several switches of the assembly is indicated by a broken line interconnecting the switches and coil L1C as is conventional in electromechanical diagrams. In the assembly L1 of rotary switches, twelve peripheral contacts or stations are provided for each switch except the first, and the sweep contacts accordingly make one cycle or revolution each twelve seconds when the timer provides one driving pulse per second. In the drawings, the peripheral contacts are indicated as respective series of circularly disposed dots arranged about the inner end of the respective sweep contact arm as an axis; and the sweep contact arms are indicated as radially directed arrows contacting one or another of the respective associated peripheral contacts. The contacts or stations of the several switches of the L1 assembly are identically numbered as are the hours figures on a time clock, as indicated at switch L1S2 in Fig. 1; and the sweep contacts step or rotate clockwise. The stations of the several switches of a second rotary switch assembly L2 are similarly identically numbered from 1 through 18, as indicated at switch L2S7 at the top of Fig. 1. The sweep contacts of this switch assembly likewise step or rotate in a clockwise direction as viewed in the drawings. Any suitable type of rotary stepping switch assembly may be employed for units L1 and L2. One example of a suitable commercially available type of rotary stepping switch assembly is that manufactured by G. H. Leland, Inc., Dayton, Ohio, and illustrated in Patent No. 2,496,880.

Timer $Ti$ comprises a conventional electronic oscillator stage, designated $Osc$, which may, for example, be of the phase-shift type employing four sections in the phase-shifting network to secure stable operation over a wide range of electron tube element voltages. The oscillator stage may comprise a self-contained amplifier. The output of the oscillator stage is applied to a relay device comprising one or more relays and herein illustrated as a single relay $Ry1$. The oscillator is designed to produce an output of fixed frequency, preferably one cycle per second, and a tube in the output stage is biased to produce discrete output pulses of current at the rate of one pulse per second. The output pulses energize coil $Ry1C$ of relay $Ry1$, whereby switch $Ry1S1$ of the relay periodically closes and opens at a rate of one cycle per second.

To conserve power, there may be connected in the power supply circuit of battery B1 a flow switch $Fs$ which is automatically closed in the herein disclosed embodiment of the apparatus by the pressure of drilling fluid passing through the drill string Ds of the drilling means; and which automatically opens when certain conditions, such as lack of fluid flow, exist. When this or an equivalent switch is closed, or when a parallel connection is closed through a homing wafer switch L1S1 of rotary switch assembly L1, closure of switch Ry1S1 of relay Ry1 permits current to flow from B1 through conductors 20 and 21, switch Ry1S1, conductor 22, cam-actuated switch L1K, conductor 23, motor coil L1C of the motor of assembly L1, ground (GND), and switch Fs and/or switch L1S1, to B1. Thus the rotary parts of switch assembly L1 are stepped forward (clockwise) one step. As this step is taken, switch L1K is opened by its motor operated cam, but sufficient current continues to flow through a holding resistor L1R to hold the switch motor advanced, until the timer relay Ry1 opens its switch Ry1S1. As the latter opens, the motor of switch assembly L1 returns or retracts preparatory to taking another step. Thus the switches of assembly L1 are, once per second, advanced one contact or station and the driving means retracted preparatory to advancing another step.

As an aid in conciseness and clarity in the description and tabulation of operations of the structural and electrical apparatus of the herein disclosed embodiment of the apparatus, various circuit elements and parts of the apparatus will hereinafter be referred to principally by way of abbreviated names and designations. For example, the circuit through switch L1S3 of assembly L1 when the switch is at its fifth station or contact, will be indicated by the expression L1S3(5), other switch stations being designated by the number of the station enclosed in parentheses. Similarly, electric conductors will be designated by ordinary numerals; relays by the expression Ry followed by a number; a relay coil by the letter C following the relay designation; resistors by the letter R followed by a number; capacitors by the letter Q followed by a number; batteries by the letter B followed by a number; etc., as indicated on the drawings and as will hereinafter become fully evident.

Control of switch or relay contacts by electromagnets or the like is indicated on the drawings by light dashed lines connecting the magnet or relay coil with the switch or contacts, as is conventional.

Referring to Fig. 1, it will be noted that the second rotary stepping switch assembly, L2, is stepped forwardly one step each time switch assembly L1 steps to station (4), the stepping power circuit for L2 being: B1, 20, 21, Ry1S1, 22, L1K, 24, L1S2(4), 25, 26, L2K, 27, L2C and GND. It will be noted that as L1 steps to (4), timer relay Ry1 is closed, and L1K closes; and that both the flow switch Fs and switch L1S1 are closed at this period. These periodic stepping operations of switch assembly L2 serve to perform switching and other functions according to a definite sequence hereinafter tabulated and explained.

Measurement of unknown resistance values is effected by a comparison method using a special form of Wheatstone bridge network Br whose circuitry is traceable on Fig. 1, but most readily traced on Fig. 2. The network comprises in its upper left arm resistor R23 and a part of an adjusting resistor R22; in its upper right arm, R24; and in its lower left arm, which may be termed the comparison arm, are the other part of R22, R21 and various combinations of resistances obtainable from an array or arrangement of series-connected resistors R5, R4 . . . R1, R0, which form comparison elements of graded and related values, as hereinafter explained. The bridge network has in its lower right arm the unknown value of resistance (in this case the resistance of an earth path between drill bit Db and a relatively remote ground connection), in series with a resistor R13. Across a diagonal of the network, from junction A to junction B, there is provided an output circuit comprising series connected resistors R26 and R25, from the junction D of which is taken an output line through a capacitor Q6 and conductor 56. Resistors R5, R4 . . . R0 are individually connectible in the lower left arm of the bridge network by movement of respective elements of two-position switches Sw5, Sw4 . . . Sw0, each individually associated with a respective one of the resistors and arranged to short-circuit its associated resistor when in a first position. When the respective resistor is thus short-circuited, it is, in effect, electrically removed or withdrawn from the network, although still physically connected in series with the other resistors of the group. The elements of switches Sw5, Sw4 . . . Sw0 are further so constructed and arranged that each is in turn moved to a second position by mechanical connection with the motor means of rotary stepping switch L2, as indicated on Fig. 1 by the dashed line. The arrangement is such that Sw5 is moved from its first to second position first, as L2 steps to station (1); Sw4 is the next to be similarly moved, as L2 steps to (2); and so on until each of switches Sw5 . . . Sw0 has been thus moved. Means in the form of a reject solenoid Sol, (Fig. 1) is provided to reversely move or return any of switches Sw5 . . . Sw0, each in turn and immediately after its opening, in the event it is desirable to again short circuit the associated resistor to remove or withdraw it from the bridge network, as will presently be more fully explained.

In commencing measurement of the unknown value of resistance, switch Sw5 is opened as L2 steps to station (1), electrically inserting the associated resistor R5 in the balancing arm of the bridge network. If this resistor is of value such as to cause overbalancing of the bridge, that is, is greater than necessary to cause the network to become balanced, its associated switch, Sw5, is returned to its first position by means including solenoid Sol, as hereinafter described. However, if R5 is determined, by discriminating means also hereinafter described, to be of value only sufficient to balance the network, or insufficient to balance the network, the associated switch Sw5 is left in second position, leaving R5 effectively connected or retained in the bridge network balancing arm. The described action is repeated with respect to the remaining resistors R4, R3 . . . R0, each in its turn, until each has been "tried" in the balancing arm of the network by movement of its associated switch to second position, and either retained therein or "rejected" (that is, electrically withdrawn or removed from the network), by return movement of the associated switch to first position. By selecting the ohmic values of resistors R5 . . . R0, of suitably graded and progressively decreasing values interrelated in a manner hereinafter more fully explained and such that R5 is greater than R4, R4 greater than R3, etc., it will be seen that by the time each of the resistors has been tried in the network and retained or rejected, the network will have been balanced to within ±50% of the value of resistor R0. Similarly, it will be noted that the unknown value of resistance will have been matched to within ±50% of the value of the resistor of lowest value in the series.

For facility in explaining the operation of the bridge network, resistors R5 . . . R0 are given hypothetical serial numbers as indicated on the drawings, and the resistors are, as previously indicated, tried in the bridge network balancing arm in inverse order of their respective serial numbers, that is, highest serial number, corresponding to highest resistance value, first, and so on. While many physical arrangements of comparison elements or resistors R5 . . . R0 may be used, and comparison elements of various orders of selected values, it is preferred to employ resistors of values V mathematically interrelated in accordance with the formula $V = C2^n$ wherein V is the resistor value (as in ohms, for example), C is a constant dependent upon circuit element values, and $n$ is the serial number of the resistor in the series-connected array indicated, and is one of a group of consecutive whole numbers equal in number to the number of resistors R5 . . . R0. It will be noted that the serial numbers need not be physically applied to the resistors; and that the resistors need not be actually series-connected in the particular order of their serial numbers, as long as they are selected and "tried" in the bridge network arm in order of decreasing value, that is, highest-valued resistor first, and so on down to lowest-valued resistor last.

With resistors R5 . . . R0 of graded and interrelated values according to the formula above indicated, and tried in the bridge network in the order mentioned by successive steps of assembly L2, the arrangement is such that the total ohmic value of resistances R5 . . . R0 left effective in the bridge arm is readily encoded or "read out" by noting which of switches Sw5 . . . Sw0 are in first position and which are in second position, and assigning zero value to each switch in first position and to each switch in second position a value corresponding to or representing that of its associated resistor. Also, with resistors selected in accordance with the above given formula, the positions of the switches may readily be employed in electrically encoding the cumulative total of the resistance of the nonwithdrawn (retained) resistors, according to the binary system of number representation, and formulating a plural-element signal representing the total. As will hereinafter become evident, the encodement can be of a number equal to the mentioned cumulative total, or of a number mathematically related to the cumulative total in accordance with a known mathematical relationship. For example, the encoded number may be a specified known amount greater than, or less than, the cumulative value of the retained resistors. The binary system of number representation employs as a radix the number 2, which is the number of possible switch conditions (first and second) presented by the switches Sw5 . . . Sw0 after each has in its turn been moved to second position and left there or returned to first position by the previously mentioned apparatus and operations. Further, the binary system conforms to the above-indicated preferred mathematical relationship of the resistor values. As a specific example, if R0 were assigned a value of 1C ohms, R1 would be of 2C ohms value, R2 of 4C ohms, R3 of 8C ohms, R4 of 16C ohms, and R5 of 32C ohms, according to the mentioned formula, and according to the table:

$R0 = C2^0 = 1C$  $R3 = C2^3 = 8C$
$R1 = C2^1 = 2C$  $R4 = C2^4 = 16C$
$R2 = C2^2 = 4C$  $R5 = C2^5 = 32C$

Thus, with the described apparatus any unknown value of resistance less than the sum of the R5 . . . R0 values (63C ohms) could be measured by comparison, to an accuracy within ±.5C ohms; and the value as measured could be represented in code form with only six code elements selected from only two types of symbols, each of the latter representing a respective one of the two switch positions. That is, any resistance value between 0 and 63C ohms could be represented with a degree of accuracy within ±.5C ohms by a particular arrangement of only six such code elements; and it is evident that by employing a greater number of resistors similarly arranged and related, any magnitude of unknown value of resistance could be measured and encoded with a relatively small number of code elements of only two types. Extending the specific example, code types or symbols could be assigned as + for switches in second position and − for switches in first, and a measured value of, for example, 26C ohms would in code be represented by: −, +, +, −, +, −, the corresponding numerical values being: 0, 16C, 8C, 0, 2C, 0, as indicated in the previous table, it being recalled that a switch in first position (− symbol) represents a rejected resistor and hence zero value.

The positions of the switches Sw5 . . . Sw0 are in the preferred form of apparatus used to encode the measured resistance value by the provision of auxiliary circuits, one for each switch and each of which is closed by a respective one of the switches only when the latter is in its second position; and a plural-element signal composed of time-spaced signals elements each of one or the other of two types is formulated, using the auxiliary circuits. One type of signal element (+, or positive) is formed as a pulse of current through the respective auxiliary circuit; and the other type of signal element (−, or negative) is formulated and indicated merely by the absence of a pulse of current. Each signal element has an allotted period of time; that is, a definite individual time-position in the plural-element signal. Further, as will hereinafter be evident by the tabulation of sequential operations of the apparatus, there are as many signal elements in the signal as there are comparison elements, whereby individual signal-elements correspond to respective comparison elements. Thus each positive signal element may be assigned or represent a numerical weight or value equal to the value of its corresponding comparison element; and every negative signal element will accordingly represent a numerical weight of zero since the corresponding comparison elements are those that have been rejected (withdrawn) from the network balancing arm. It is evident then that the signal elements will be spaced apart in time, those of positive sign representing measurement values according to their respective positions in the coded signal in accordance with the preceding table, and those of negative sign representing always a zero value regardless of position in the signal. The formation of the signals will hereinafter be more fully explained in connection with a tabulation of sequential operations of the preferred form of apparatus indicated on the drawings.

It is evident that if current is applied to the input terminals of the bridge network continuously, a relatively large amount of power will be consumed. Novel means are provided whereby the bridge network has applied thereto only a brief pulse of power each time a resistor or comparison element is tried in the network, each pulse being preferably of a duration of the order of one millisecond. Further, the pulses are produced by means not including electron tubes, so the continual drain of power to operate electron tubes for pulse-producing purposes is avoided. The means for producing the bridge network energizing pulses includes a battery B3, a capacitor Q2, a resistor R10, and switches L1S5, L2S5 and L2S6, operation of all of which in producing the pulses is hereinafter explained.

The pulse of current passed through the bridge network for each comparison produces across the network output terminals at junctions A and B an output pulse (unless the network is balanced), the polarity of the pulse being dependent upon whether the bridge is overbalanced or underbalanced. That is to say, if the comparison element being tried in the arrangement of comparison elements then effective in the balancing arm of the bridge network is of value greater than that necessary to balance the network, the latter will be overbalanced and the output pulse will be of a first and predetermined polarity; whereas if the comparison element being tried is of value insufficient to cause the network to be balanced, the network is underbalanced and the output pulse will be of a second and different predetermined polarity. If the comparison element being tried in the network brings the network to a condition of balance, no output pulse will be produced when the network is energized. Pulses of said first polarity only are employed to initiate action of means including a reject solenoid Sol, which operate to remove or withdraw from the network the comparison element whose effective insertion into the network resulted in overbalancing. Pulses of the opposite (second) polarity, and absence of an output pulse, fail to initiate the described action of the comparison element withdrawing means, whereby those comparison elements whose trial in the network fails to cause network overbalancing are retained in the network, regardless of whether the network is thereby balanced or merely left underbalanced. The output pulse, when one is produced, is of low power and brief duration and of insufficient strength to directly actuate the reject solenoid, Sol, when necessary. Also, an output pulse is produced across the bridge when the network is underbalanced, in which case it is not desired to actuate the reject solenoid to return to first position the switch of the resistor being tried in the network. Hence means are provided for amplifying the output pulses, and for discriminating between those of the first polarity indicative of bridge overbalance, and those of the second or opposite polarity, indicative of bridge underbalance. This pulse polarity discriminating means is effective to pass only those pulses indicative of bridge overbalance, the passed pulses being used to initiate further operations leading to energization and operation of the reject solenoid Sol. The novel pulse polarity discriminating means is so devised that it may also be employed as a pulse gate, whereby spurious or transient pulses, such as those resulting from oscillatory output of the pulse amplifier, are not allowed to pass through and initiate operation of the reject solenoid.

Since pulse amplification, gating, etc., requires the use of electron tubes, which in the normally used sizes are fragile and consume relatively large amounts of filament or heater power, special novel means are provided which permit use of normally nonconducting subminiature electron tubes, which are much less fragile and consume little power, and which special means allow such use of subminiature tubes although the instantaneous output thereof is of insufficient power to operate the reject solenoid or a relay for the solenoid.

Referring to Fig. 2, which depicts in simplified form that part of the apparatus and circuitry of Fig. 1 which is directly involved in making resistance comparisons, and assuming switch Sw5 has been moved from first to second position, a pulse is produced across the bridge network input by sudden discharge of capacitor Q2. Q2 is charged by the potential of battery B3 when a charging circuit, hereinafter described and including 73, R13, Db, GND, R24, 49, R28, Q2, 50, L2S6, 40, L1S5, L2S5 and B3, is closed by switch L1S5 each time that switch steps to station (10), providing both of switches L2S5 and L2S6 are at one of stations (1 . . . 6). Thus Q2 charges through the bridge network. The charging occurs during a fraction of the time L1S5 is at station (10); for example, during about one millisecond of time. As L1S5 thereafter steps to (11), Q2 discharges through the bridge network and R10 in approximately one millisecond, the discharge pulse producing an output potential pulse across the output junctions A and B (unless the bridge is balanced). An output potential pulse across A—B will produce a potential pulse at point D of the network, which latter pulse is applied by way of conductor 56, capacitor Q6, switch L2S4 at station (1, 2, 3, 4, 5 or 6), and conductor 57, to the primary winding of an amplifier input transformer Tr1. The purpose of capacitor Q6 is to prevent the natural potential of the earth from interfering with resistance measurements. The transformer pulse produced at the secondary of Tr1 is applied by way of coupling capacitor Q3 to the input of an amplifier device comprising electron tubes Vt1 and Vt2; and the amplified pulse is applied by way of capacitor Q5 to the control grids of a pair of normally non-conducting electron tubes Vt3 and Vt4 comprised in the mentioned pulse gate and pulse and pulse polarity discriminating means. The polarity of the pulse applied to the control grids of Vt3 and Vt4 may be adjusted or reversed by reversing the connections to the primary of Tr1. If the pulse applied to the grids is positive (as it will be only when the bridge network is overbalanced), Vt3 and Vt4 will thereby be made to conduct, but only for a brief period during an interval of from .5 to .8 millisecond during which anode potential remains applied to those tubes. Anode potential (+45 v.) is applied to Vt3 and Vt4 during the one second interval L1S3 is at station (10), by way of 61, L1S3 (10), 62 and +45 v. In the substantially concurrently stepped switches L1S3, L1S4 and L1S5, preliminary adjustments are made such that, as L1 steps, L1S5 opens, with L1S4 opening any time within 100 microseconds prior to or following opening of L1S5; and L1S3 opens from .5 to .8 millisecond after L1S5 opens. Hence, the anode voltage is applied to Vt3 and Vt4 for only about .5 to .8 millisecond after the initial bridge energizing pulse is produced by opening of L1S5 as it steps from (10) to (11); and thus any transient after-pulses cannot be passed through Vt3 and Vt4 for lack of anode voltage. In this manner Vt3 and Vt4 act as a pulse gate. Switch L1S4 acts through conductors 35 and 36 to short circuit a capacitor Q1 in the cathode circuit of Vt3 and Vt4, the short circuit being effective for several seconds prior to stepping of L1 from station (10). This short circuit is removed prior to reception of a pulse at Vt3 and Vt4, by opening of L1S4; there being a little more than 100 microseconds' delay in pulse transmission time in the amplifier, etc., between L1S5 and Vt3 and Vt4. Accordingly, if the latter tubes conduct and pass a pulse in response to overbalancing of the bridge network, capacitor Q1, now no longer short circuited, is charged through the cathode circuit of Vt3 and Vt4. Q1, when thus charged, is effective to provide a potential for the control grids of electron tubes Vt5 and Vt6. This potential is of positive polarity and magnitude sufficient to cause normally nonconducting tubes Vt5 and Vt6 to conduct. The purpose or function of Q1 is to maintain the potential produced by the brief pulse of current through Vt3 and Vt4, for a relatively long time, whereby tubes Vt5 and Vt6 may be rendered conductive for a time much longer than the duration of the current pulse through Vt3 and Vt4. In other words, Q1, Vt5 and Vt6 act as a pulse extender, stretching the pulse length to several times its original duration. The pulse provided in the cathode circuit of Vt3—Vt4 is much too brief and weak to operate a relay. Similarly, the instantaneous output of Vt5 and Vt6 is too weak to operate a relay. By accumulating the output of Vt5 and Vt6 over a period of several seconds, however, enough energy becomes available to operate a relay. The charge on Q1, remaining substantially undiminished for a period of six seconds during which L1S4 steps from (10) to (11) and to (12) and on to (5), permits Vt5 and Vt6 to conduct during that time and thereby accumulate a powerful charge on capacitor Q4, which is connected as indicated in the anode circuit of Vt5—Vt6. This charge, when permitted to pass through the coil of an ordinary relay such as Ry2, will operate the relay. As L1S3 steps to (5), Q4 is permitted to discharge through relay coil Ry2C which, thus energized, closes Ry2S1. Closure of Ry2S1 closes a battery powered circuit through the reject solenoid Sol; whereby the solenoid is operated and switch Sw5 is returned to first position to withdraw or reject the comparison element R5 from the bridge arm. Of course, if the bridge were either underbalanced or just balanced, no pulse would be passed through Vt3 and Vt4, and rejection of R5 would not occur.

The previously described series of operations is, in general, repeated as L2 steps through each of stations (2), (3), (4), (5) and (6), but at each step a succeeding one of comparison elements R5 . . . R0 is accepted or rejected by operation of the corresponding one of switches Sw5 . . . Sw0, the solenoid Sol being successively positioned (as for example by action of switch assembly L2) to return to first position only that switch most recently moved to second position by stepping of L2. Any suitable type of switch assembly and reject solenoid and actuating means therefor may be employed as a unit for switches Sw . . . Sw0. One suitable type is that disclosed in the aforementioned copending application of Robert Lee Alder.

Formulation of the aforementioned signal, as well as other operations of the preferred embodiment of apparatus, will be illustrated and described in detail in connection with a typical resistance-measuring operation, in a tabulation of sequential operations hereinafter set out. An "unknown" value of resistance of 840 ohms will be arbitrarily selected for measurement, as an example. Various components of the apparatus may be of values as indicated in the following list; others being of value indicated by good design practice:

| | |
|---|---|
| B1—66 volts | R8—1 megohm |
| B2—30 volts | R9—1 megohm |
| B3—6.5 volts | R10—400 ohms |
| B6—13.3 volts | R11—2 megohms |
| B7—1.3 volts | R12—200,000 ohms |
| Q1—8000 mmfd. | R13—110 ohms |
| Q2—3 mfd. | R21—2760 ohms |
| Q3—3000 mmfd. | R22—50 ohms |
| Q4—50 mfd. | R23—2760 ohms |
| Q5—3000 mmfd. | R24—110 ohms |
| Q6—.68 mfd. | R25—4000 ohms |
| R0—20 ohms | R26—3000 ohms |
| R1—40 ohms | R28—100 ohms |
| R2—80 ohms | R31—166,700 ohms |
| R3—160 ohms | R32—82,700 ohms |
| R4—320 ohms | R33—334,600 ohms |
| R5—640 ohms | R41—100 ohms |
| R6—2 megohms | R42—100 ohms |
| R7—1 megohm | R43—100 ohms |

*Tabulation of sequential operations*

| Period | L1 Station | |
|---|---|---|
| 0 | 11 | This is a period marking the commencement of operations, with L1 at station (11) and L2 at (18). Flow switch Fs is closed (in this case by fluid flow in the drill string Ds). |
| 1 | 12 | L1 steps to (12). A synchronizing signal element of positive (+) type is commenced. As hereinabove indicated, all signal elements are of either positive or negative type; and each is assigned a definite period of time in the cycle of timed operations of the apparatus. Synchronizing signal elements are of the positive type, and these, together with all other positive signal elements, are initiated by respective flows or "pulses" of electric current which are caused to flow at prescribed times. negative signal elements are initiated by lack of an electric current flow or pulse at prescribed times. When no current flows in the signaling circuit at a time set or allotted for creation of a signal element, a negative signal element is thereby formulated, and mere inaction of the signaling circuit and apparatus is sufficient for the purpose. Positive signal elements, represented by a current flow or pulse, are produced by electrical operation of the signaling circuit and apparatus at the prescribed periods of time. It is evident that the aforementioned auxiliary circuits, each corresponding to a respective one of switches Sw5...Sw0 and closed by its respective switch only when the latter is in its second position, may thus be employed as primary controlling means for the signal circuit in formulating the plural-element signal representing the measure of the unknown value of the physical quantity. As will be made clearly evident hereinafter, the auxiliary circuits are also closed in timed sequence by switch L2S1, to correctly time or space the signal elements in the signal. In the disclosed exemplary embodiment of apparatus, a signaling device in the form of an electromagnetically actuated valve V is provided (Fig. 1), the valve having an operating magnet coil Vc to receive and utilize the aforementioned periodic flows of electric current, to produce flow or pressure changes in a drilling fluid stream in the drill string Ds. The synchronizing signal element is produced by actuation of valve V by current flow through the following circuit: B2, 30, L2S7(18), 31, L1S6 (12, 1S and 2), 32, Vc and GND; at a time governed by L1S6. The flow or pressure change produced in the stream of drilling fluid flowing downwardly through drill string Ds is quickly transmitted thereby to an accessible point near the top of the drill string outside the borehole. It is there detected and translated by suitable signal receiving and translating means (not shown) which may be of conventional design and comprise principally a pressure transducer and a recorder connected to receive and be regulated by and record the output of the transducer. |
| 2 | 1 | The synchronizing signal element, employed to time operations in the receiver device is continued in this period in which L1 is at station (1). |
| 3 | 2 | As in period 1. The synchronizing signal element is terminated at the end of this period as current is cut off from the signaling circuit and Vc as L1S6 steps from (2) to (3). |
| 4 | 3 | Idle period, separating creation and transmission of the first synchronizing signal element from other actions of the apparatus. |
| 5 | 4 | L2 is stepped from (18) to (1), the energizing circuit being through L1S2 as hereinabove indicated. Stepping of L1 to (4) and L2 to (1) prepares the apparatus controlled by L2 for the initial steps of the operations of measuring the unknown value of resistance, encoding a number representing the value as measured, and formulating a number-representing signal. As L2 is stepped to (1), Sw5 is actuated from first position to second position, removing the short-circuit from R5 and thus electrically inserting R5 into the balancing arm of the bridge network Br. At the same time, the moved part of Sw5 closes or causes closure of the associated auxiliary circuit at that point. |
| 6 | 5 | L1S4 in stepping to (5) short circuits capacitor Q1, which short-circuit remains effective substantially until L1 subsequently steps from (10) to (11), as hereinabove noted. The short circuit is by way of Q1, 35, L1S4(5) and 36. |
| 7 | 6 | As L1 steps to (6), a second synchronization signal element is commenced, the circuit being: GND, Vc, 32, L1S6(6), 37, L2S1(1), 68, 39, B2 (+30 volts) and GND. This signal element continues while L1S6 is at stations (6), (7) and (8), and constitutes the second three-second synchronization signal element. |
| 8 | 7 | Continuation of action of period 7. |
| 9 | 8 | Continuation of action of period 7, and termination of the synch signal element at the end of this period. |
| 10 | 9 | Idle period. |
| 11 | 10 | As L1 steps to (10), L1S5 at (10) closes a circuit which permits battery B3 to charge capacitor Q2 in preparation for production of an energizing pulse for the bridge network. The charging circuit is: B3, 42, L2S5(1), 41, L1S5, 40, L2S6(1), 50, Q2, on one side, and Q2, 28, 49, R24, GND, Db, R13, 73, 44, and 43 to B3 on the other side. Q2 charges in about one millisecond of time. A pulse across the bridge output circuit is of course produced at this time, but it is of no consequence since, among other things, L1S4 is short circuiting capacitor Q1 so that no effect is produced in Vt5 and Vt6. The pulse to be employed in energizing the bridge network for measurement purposes is that produced by discharge of Q2, as hereinabove noted. During this period, anode potential (of 45 volts, for example) is applied to Vt3 and Vt4 through 61, L1S3- (10) and 62. |
| 12 | 11 | Switches L1S3, L1S4, and L1S5 have been adjusted as previously described. In stepping from station (10), L1S3 opens from .5 to .8 of a millisecond after L1S5 opens; and L1S4 opens no later than 100 microseconds after L1S5, so Q1 is unshorted prior to possible arrival of a pulse at Vt3 and Vt4. As L1S5 opens, Q2 discharges and the bridge network is pulsed or energized with comparison element R5 in the balancing arm. Since the "unknown" value of resistance is in this assumed case 850 ohms and R5 is 640 ohms, a negative pulse arrives at Vt3 and Vt4 and fails to pass therethrough, those tubes being already biased to cut-off. Hence the reject solenoid Sol will not be operated and Sw5 will remain in its second position leaving R5 accepted (nonwithdrawn) and electrically connected in the balancing arm of the bridge. Sw5 will thus keep closed the auxiliary circuit connection between conductors 39 and 38, used later in period 19 in reading out the R5 comparison value of 640 ohms and in formulating a measurement-representing signal element corresponding to Sw5 and R5. L1S1 at this time opens its portion of the main power supply circuit, so if flow switch Fs is open the apparatus will cease to operate until Fs again closes. It is assumed throughout that Fs remains closed. |
| 13 | 12 | Idle period. |
| 14 to 16 | 1 to 3 | Idle periods. |
| 17 | 4 | L2 is stepped from (1) to (2) as L1S2, at (4) closes the circuit to supply stepping power to L2C. As L2 steps to (2), Sw4 is moved from first position to second position (opened) by L2, and the reject solenoid Sol is repositioned for possible coaction with Sw4. Actuation of Sw4 closes at that point the auxiliary circuit including 39 and 60, for subsequent signal circuit energization if comparison element R4 is accepted and retained in the network. |
| 18 | 5 | Q1 is again shorted, as in period 6, by L1S4, 35 and 36. The circuit through Rq2C is closed for discharge of Q4 by L1S3. No discharge occurs in this instance, however, since no pulse was passed by Vt3—Vt4 in period 12 and Q4 was therefore not charged. Reject solenoid Sol is accordingly not energized and does not operate at this time |

| Period | L1 Station | |
|---|---|---|
| 19 | 6 | L1 steps to (6) and a positive (+) information-representing signal element (the first element of a six-element signal representing the measure of the unknown value of resistance) is formed and transmitted. The signal is transmitted by, in this example, a flow of current and operation of valve V by energization of Vc causing a fluid flow change in the drill string, the current being supplied through the circuit: +30 v., 39, Sw5 (now in second position and connecting 38 and 39), 38, L2S1(2), 37, L1S6(6), 32, Vc and GND. |
| 20 | 7 | L1 steps to (7) and the first information signal-element continues. This signal element corresponds to Sw5 and R5 and is related in time sequence to the actuation of Sw5 and the nonwithdrawal of R5. |
| 21 | 8 | As in period 20, the signal element ending with the end of this period. The first signal element (positive in this example) is definitely spaced in time 18 seconds after the commencement of the first synchronization signal element, and 12 seconds after the commencement of the second synchronization signal element; and, like the other signal elements, is of substantially three seconds' duration. As the first signal element of the first information signal, it carries a "weight" of $C2^5$, equal in this specific example to 640, the relative ohmic value of R5. That is, when the signal element is received at the accessible point, being the first element of the information signal and positive, it is recorded or otherwise evaluated as representing a value V of $C2^n = C2^5 = 32C$, C in this example being equal to 20 and n for this particular signal element being 5, corresponding to R5 and Sw5. |
| 22 | 9 | The discharge path for Q4 is opened as L1S3 steps from (9) at the end of this period, preparing Q4 for possible recharging. |
| 23 | 10 | Plate potential of 45 v. is applied to Vt3 and Vt4 through 61, L1S3(10), and 62. Current is again supplied by B3 to recharge Q2, as in period 11 hereinabove. As L1S5 steps from (10) Q2 is discharged through the bridge network which now includes in the balancing arm both retained comparison element R5 and newly inserted comparison element R4. Since these two resistors in series total 960 ohms, the bridge network is, by insertion of R4, overbalanced; and as a result a positive pulse is applied to Vt3 and Vt4, and Q1 is charged in the manner hereinabove explained. Vt5 and Vt6, normally biased beyond cut-off and hence normally nonconducting, now are rendered conductive due to the grid potential being raised by the charge on Q1 to above cutoff value; and Q4 commences charging. |
| 24 | 11 | The accumulation of charge by Q4 continues, or may continue, either until Q4 is fully charged or until L1S3 steps to (5); the charge on Q1 being effective to overcome the normal negative grid bias on Vt5 and Vt6 during all of this six-second interval. |
| 25 to 28 | 12 to 3 | As in period 24. |
| 29 | 4 | L2 steps to (3) moving Sw3 to its second position and thus inserting R3 in the balancing arm of the bridge network. Charging of Q4 may continue. |
| 30 | 5 | Q1 is again short-circuited by L1S4. Q4 discharges through Ry2C, causing operation of reject solenoid Sol which in operating returns switch Sw4 to first position. The return of switch Sw4 to first position again short circuits and thus rejects or withdraws R4 from the balancing arm of the bridge network; and leaves R5 and R3 in series in that arm. |
| 31 to 33 | 6 to 8 | This interval, devoted to formulation and transmission of the second information signal element, corresponding to R4, finds the signal current path interrupted at switch Sw4 which was returned to first position by the reject solenoid in period 30. The signaling path, through: +30 v., 39, 60, L2S1(2), 37, L1S6(6, 7, 8), 32 and Vc, is therefore ineffective to pass current, and the resultant lack of current and of energization of Vc at the prescribed time results in a negative signal element being formulated. When the receiver at this time fails to detect a positive signal element, in this case a change of drilling fluid flow, a figure or value of zero will be recorded or registered for this particular signal element. |
| 34 to 1 | 9 to 8 | During this extensive interval, the above-described operations are, in general, repeated, L2 stepping one step each comparison cycle. R3, R2, R1 and R0 are each in turn tried in the balancing arm in series with previously retained resistors, by previously described operations, including actuation of Sw2, Sw1 and Sw0, each in its turn. In this particular example, resistors R3 and R1 are accepted as was R5, and resistors R2 and R0 are withdrawn or rejected as was R4. Thus the interval ends at the end of period No. 80, and with the termination of the sixth signal element of the information-representing signal, with L1 stepping from station (8) and with L2 at (7). The formulated and transmitted plural-element signal consisted of the following arrangement of positive and negative elements: + − + − + −. Translating these elements by assigning to each the weight or value assigned to the corresponding comparison elements as hereinbefore indicated, the signal is translated and evaluated thus: 640, 0, 160, 0, 40, 0. By integrating or adding the several values, the signal is found to represent 840. In performing this translation it is again to be noted that any negative signal element represents a value of zero only, since it corresponds to a withdrawn comparison element. L2 being now at (7), the resistors R5 . . . R0 are electrically severed from the bridge network by L2S3, which is now open; and until that switch steps to (10) and again connects those resistors in circuit, further bridge network measuring operations are precluded. Also, as L2 steps to (8) at the end of the interval, signaling is precluded for a 36-second period during which L2 is at (7), (8) and (9). This interval is used to separate, in time, the information signal representing a resistance measure, and a signal of a second information channel and in this example representing a measure of an "unknown" value of voltage or potential. In the example hereinafter employed in explaining this feature of the operations, the unknown potential will be assumed to be that of a portion of an earth formation adjacent an inaccessible location in an earth borehole, with respect to an electrode represented by drill bit Db, affixed to the lower end of drill string Ds. |

The hereinabove described part of the apparatus is with only slight modifications employed in an automatic compensating voltmeter capable of accurately measuring voltage values of sources of either high or low internal resistance; and, as in the case of the previously described resistance measurements, of encoding a number equal to or representative of the voltage value, and formulating a coded signal representing the number and value. Further, this type of operation is conducted with similarly great savings in power. In arranging the apparatus to perform this function it is only necessary to so connect resistors R5 . . . R0 that a comparison quantity or voltage is developed across each and proportional to the respective resistances, using switches Sw5 . . . Sw0 and their actuating mechanisms as before; and of course it is necessary that the unknown voltage be so added to that across the resistors that output voltage pulses of proper polarities are provided for the amplifier input. Thus the connections are made such that when the comparison voltage exceeds the unknown voltage which it is connected to oppose (that is, overbalances the potentiometer), the same conditions prevail as obtained when the bridge was overbalanced in measuring resistance; and similarly, when the opposing voltages are equal, corresponding to the condition of bridge balance, no pulse is applied to the amplifier, and when the unknown voltage exceeds the comparison voltage the apparatus acts as when the bridge was underbalanced. Referring optionally to Fig. 1, or Fig. 3, which is a simplified circuit diagram, the comparison voltages are produced across resistors R5 . . . R0 by passing a current from a battery B6 through a resistor R30 of high resistance to produce a voltage drop across R30, which voltage drop is applied to the following series circuit including the comparison element resistors: R30, 70, L2S3(10–15), 47, 71, 72, R0, R1, R2, R3, R4, R5, 45, 44 and a selected one of high resistance resistors R31, R32 and R33 (R31 as shown). Due to the high resistance of R31 with respect to R5 . . . R0, a substantially constant individual voltage drop exists across each of the latter (when in the circuit) regardless of the insertion in or removal from the circuit of one or more thereof. These "standard" or comparison voltages, which are of differing interrelated values according to the ohmic values of the respective resistors, are in sequence tried, each in its turn, in opposition to the unknown voltage by connection in series therewith as will hereinafter be explained. To enable the apparatus to cover a wider range of unknown potentials, a third known voltage of regulatable value is introduced in the series arrangement. The latter voltage is created across a selected number of a bank of five resistors, R41, R42, R43, R44 and R45, by a battery B7, the circuit constants being such that a range of voltages about equal to that to be covered is produced across the group. For example, 100 mv. drop is produced across each of R41 ... R45 when the constants are as listed in the previously set down table.

As a result of the circuit arrangements described and indicated, a circuit is closed when L1S5 is at (10) as indicated in Fig. 3, which permits all the three mentioned voltages to be effective in a series circuit including the primary of Tr1. Hence, if the unknown voltage is not balanced by the others, a current will flow through Tr1 (pri.) and when L1S5 steps from (10) to (11) the circuit will be opened and a pulse will be produced in the secondary of Tr1. The polarity of the pulse will be dependent upon whether the unknown potential is greater than, or less than, the voltages it opposes. (In this instance, as when resistance was being measured, an initial pulse is produced when the circuit is closed, but this initial pulse is equally ineffective. The active pulse is that produced when the circuit is opened at L1S5.) The current carrying series circuit is: Tr1 (pri.), GND (as represented by the drill string), the earth, D$b$, R13, 73, 45, R5 (S$w$5 being at this time in second position), S$w$4 ... S$w$0, 72, 71, 47, L2S3(10–15), 70, 74, 75, R41, 76, L2S5(10–15), 41, L1S5(10), 40, L2S6(10–15), 77, L2S4(10–15), and 57 to Tr1 (pri.). The three voltages in the circuit are those across R41, across R5, and between D$b$ and GND as represented by an exposed uninsulated part of the drill string, which is insulated from D$b$ as indicated. The polarities are so arranged by circuit connections and by positioning polarity shifting switch S$w$11 that if the comparison voltage across the comparison element (in this case R5), is so high that the unknown potential is overcome, a pulse will pass through the amplifier and the pulse discriminator, and cause the reject relay and reject solenoid S$o$1 to return S$w$5 to first position.

If the unknown potential is not overcome, a pulse will not be produced at the output of V$t$3—V$t$4, and the solenoid will not be operated. The indicated procedure is repeated for each of the other comparison units R5 ... R1 and R0, each in its turn, in a manner evident from the previous description of the resistance measurement procedure. In other respects the apparatus operates in a manner similar to that described hereinabove with respect to measurement, etc. of an unknown value of resistance, L1S5 switching on the current when it reaches (10) and cutting off the current to create the pulse as it steps from (10) to (11). L2 is stepped through stations (10) ... (15) during the interval consumed in making six potential comparisons; and a plural-element signal repersenting the effective comparison value is formulated and transmitted as L2 traverses stations (11) ... (16), in an obvious procedure.

Following measurement, encoding and signaling of a number representing the unknown value of potential, the apparatus introduces a 27 second spacing period during the time L2 is at (16), (17), and (18), prior to recommencement of the complete cycle of operations thus far described. Thus two channels of information are transmitted, each in its turn, in the manner of time-division multiplex signaling, in each 216 second interval. The entire before-described sequence of events is automatically and cyclically repeated, to provide a continued series of measurements and measurement-representing signals. It should be noted that after the first comparison or trial of a comparison element is effected (in this case the trial of R5 or the voltage thereacross), succeeding comparisons are made in which against the unknown value there is compared an arrangement of one or more comparison elements. If only one comparison element is in the arrangement, that comparison element is by itself opposed to the unknown value to be measured; but if there has been a previous trial and retention of a comparison element, then the arrangement will include one or more comparison elements. Thus the actual comparison that is effected when a given comparison element is tried in the comparison network is that of a variable arrangement of comparison elements, with the unknown value. The variable arrangement may be composed of but one, or of two or more, comparison elements.

While in the specific embodiment of apparatus herein employed to illustrate a system and mode of operation according to the invention, comparison elements or quantities in the form of resistances and voltages were employed, it is evident to those skilled in the art that other types of comparison elements or quantities may be employed. Further, while for convenience of illustration the comparison elements were chosen so as to be interrelated according to a particular mathematical system of number representation known as the binary system, so advantages inherent in a signaling system employing only two types of signal elements could be secured; it is evident to those skilled in the art that other mathematical number-representing systems may be utilized. It was noted that with six comparison elements and employing binary notation and values, a range of unknown quantity values of from 0 to 63C could be measured to an accuracy within ±.5C. However, by increasing the number of comparison elements any desired range of unknown values may be encompassed. Also, by choosing the value of the lowest-valued comparison element small enough, any desired degree of accuracy may be attained in the measuring operation. Thus the measurement of an unknown value may be effected with extreme accuracy. The number encoded by the apparatus is seen to represent precisely the value as measured. The number may be either the actual value as measured, as in the resistance measurement hereinabove tabulated in detail; or it may be that value plus or minus a given amount or otherwise definitely related to the value in accordance with a known mathematical relationship, according to comparison network component values. The signal formulated and transmitted represents quite precisely the encoded number. The system, by employing brief pulses of energy for network energization and normally non-conducting sub-miniature electron tubes in the novel circuitry, attains remarkable economy of operation while attaining extreme accuracy in measuring and signaling.

Also, it should be noted that while in the preferred embodiment of apparatus according to the invention the comparison elements are connected into a variable arrangement thereof wherein the several elements are connected in series, other configurations and types of connections may be employed within the spirit of the invention. Forms of switches and other apparatus components different from those diagrammatically illustrated may be employed.

Since modifications of the disclosed apparatus and method have hereinabove been suggested, and others will be evident to those skilled in the art, it is not desired to be limited to the specific details of the preferred embodiment of a system according to the invention, but what is claimed is:

1. Means for producing and transmitting a signal indicative of the value of a physical quantity, comprising: an electrical bridge network having an input connection, and output connection, and two arms, the first of which arms is connectable across an electrical circuit having an electrical characteristic representative of said value; a plurality of separate circuit elements, each of fixed different electrical characteristics; means to introduce each of said separate circuit elements sequentially in series into said second arm; means responsive to the output from the said output connection as effected by overbalance and underbalance of said bridge network, when energized through said input connection, to maintain such of the thus introduced circuit elements in series in said second arm as results in underbalance of said bridge network and to reject and remove such of the thus introduced elements from said series connection in said second arm as result in overbalance of said bridge network; and means responsive to the action of said last mentioned means to produce and transmit a signal pulse each time a circuit element which is thus introduced in series into said second arm is not rejected and withdrawn therefrom and prior to the next sequential introduction of a circuit element into said second arm.

2. Means for providing and transmitting a signal indicative of the value of an electrical resistance, comprising: an electrical bridge network having an input circuit, an output circuit, and two arms, the first of which arms is connectable across said resistance; a plurality of resistance elements, each of fixed different values; means to introduce each of said separate resistance elements sequentially into the second of said arms; means responsive to the output from the said output connection as effected by overbalance and underbalance of said bridge network when energized through said input circuit, to maintain such of the thus introduced elements in said second arm as result in underbalance of said bridge network and to reject and withdraw such of the thus introduced elements from said second arm as result in overbalance of said bridge network; and means responsive to the action of said last mentioned means to produce and transmit a signal pulse each time a resistance element which is thus introduced into said second arm is not rejected and withdrawn therefrom and prior to the next sequential introduction of a resistance element into the second of said arms.

3. In an earth borehole investigation system including a drill stem, apparatus for determining the unknown value of an electrical resistance therein comprising in combination: an electrical resistance bridge network in said drill stem having an input circuit, an output circuit, and two arms, in a first of which arms is connectable said resistance of unknown value to be measured and in a second of which arms is connected an opposed balancing means including a plurality of resistance elements, each of fixed different value and connectable in series; a plurality of individual, two position switches one of each associated with one of said resistance elements and arranged when in a first position to remove the resistance thereof from said balancing means and when in a second position to introduce the resistance of said resistance element in said balancing means; means sequentially and at uniform time intervals to move each of said switches from its said first position to its said second position; means to energize said bridge network by a brief pulse only of electrical energy following each such movement of each of said switches from its said first position to its said second position, to produce a bridge network output pulse of a first polarity if such switch movement to such second position results in introduction of such resistance in said balancing means as to overbalance the bridge network, and of a second polarity if such as to result in underbalance of the bridge network; means responsive to only output pulses of said first polarity to return such switch from its second position to its said first position to remove the resistance of the overbalancing resistance element associated therewith from said balancing means of said bridge network; and means to produce a signal pulse in said drill stem substantially immediately following each of said movements of said switches to is respective second position and which results in introduction of a resistance in said balancing means which results in underbalance of said bridge network such pulse occurring prior to the movement of the switch associated with another of said resistance elements to its second position, whereby a signal is produced in said drill stem each of which is composed of a plurality of time spaced pulses indicative of the unknown value of said electrical resistance.

4. In an earth borehole investigation system including a drill stem, apparatus for determining the unknown value of a physical quantity therein comprising in combination: a bridge network in said drill stem having an input circuit and an output circuit and two arms, in a first of which arm is connectable an electrical circuit having electrical characteristics representative of said unknown value to be measured and in a second of which arms is connected and opposed balancing means including a plurality of circuit elements, each of fixed different electrical characteristics and connectable in series in said balancing means; a plurality of individual, two position switches one of each associated with one of said circuit elements and arranged when in a first position in effect to remove the circuit element from said balancing means and when in a second position in effect to introduce the circuit element in said balancing means; means sequentially and at uniform time intervals to move each of said switches from its said first position to its said second position; means to energize said bridge network through said input connection by a brief pulse only of electrical energy following each such movement of each of said switches from its said first position to its said second position, to produce a bridge network output pulse from said output connection of a first polarity if such switch movement to said second position results in introduction of such circuit element in said balancing means as to overbalance the bridge network, and of a second polarity if such as to result in underbalance of the bridge network; means responsive to only output pulses of said first polarity to return such switch from its second position to its said first position to remove the circuit element associated therewith from said balancing means of said bridge network; and means to produce a signal pulse in said drill stems substantially immediately following each of said movements of said switches to its respective second position and which results in introduction of a circuit element in said balancing arm which results in underbalance of said bridge network such pulse occurring prior to the movement of the switch associated with another of said circuit elements to its second position, whereby a signal is produced in said drill stem each of which is composed of a plurality of time spaced pulses indicative of the unknown value of said physical quantity.

5. In an earth borehole investigation system including a drill stem, apparatus for determining the unknown value of an electrical resistance therein comprising in combination: an electrical resistance bridge network in said drill stem having an input circuit, an output circuit, and two arms; means in the drill stem for connecting a first one of said arms across said resistance of unknown value to be measured; means in the second of said arms for connecting it across a variable resistance means adapted by variation of the value thereof to effect either an overbalance or an underbalance of said bridge network, said variable resistance means including a plurality of separate series connectable resistance elements each of a predetermined different fixed value; means to introduce each of said separate resistance elements sequentially into said variable resistance means; rejection means actuatable separately to remove each of said thus introduced resistance elements from said variable resistance means following its introduction thereinto; means to energize said bridge network through said input circuit by a brief pulse only of electrical energy following each such sequential introduction of each of said resistance elements into said variable resistance means to produce a bridge network output pulse from said output circuit of a first polarity if such introduction of such resistance element results in overbalance or of a second polarity if such introduction of such resistance elements results in underbalance of said bridge network; means to actuate said rejection means only in response to output pulses from said output circuit of said first polarity to remove any of said introduced resistance elements from said variable resistance means the introduction of which results in overbalance of said bridge network; means responsive to each such introduction of a resistance element which does not result in overbalance of said bridge network to produce a signal pulse in said drill stem, such pulse occurring prior to the next sequential introduction of a resistance element into said bridge network, whereby a signal is produced in said drill stem composed of a plurality of time spaced signal pulses indicative of the unknown value of said electrical resistance.

6. Means for producing and transmitting a signal indicative of the value of an electrical potential, comprising: an electrical potentiometer network having an input connection, an output connection, and two arms, the first of which arms is connectable across said electrical potential; a plurality of separate potential varying elements, such of fixed different characteristic; means to introduce each of said separate potential varying elements sequentially in series into said second arm; means responsive to the output from the said output connection effected by overbalance and underbalance of said potentiometer network, when energized through said input connection, to maintain such of the thus introduced potential varying elements in series in said second arm as results in underbalance of said bridge network and to reject and remove such of the thus introduced elements from said series connection in said second arm as results in overbalance of said potentiometer network; and means responsive to the action of the last mentioned means to produce and transmit a single pulse each time a potential varying element which is thus introduced in series into said second arm is not rejected and withdrawn therefrom and prior to the next sequential introduction of a potential varying element into said second arm.

References Cited in the file of this patent

UNITED STATES PATENTS

| | | |
|---|---|---|
| 502,399 | Haskins | Aug. 1, 1893 |
| 1,783,234 | Firestone | Dec. 2, 1930 |
| 2,008,512 | Morack | July 16, 1935 |
| 2,023,221 | Fischer et al. | Dec. 3, 1935 |
| 2,030,794 | Horton | Feb. 11, 1936 |
| 2,207,743 | Larson et al. | July 16, 1940 |
| 2,354,887 | Silverman | Aug. 1, 1944 |
| 2,466,746 | Shive | Apr. 12, 1949 |
| 2,467,856 | Rich | Apr. 19, 1949 |
| 2,531,145 | Marco et al. | Nov. 21, 1950 |
| 2,633,019 | Albrecht et al. | Mar. 31, 1953 |
| 2,680,808 | Nolde | June 8, 1954 |
| 2,700,131 | Otis et al. | Jan. 18, 1955 |
| 2,759,143 | Arps | Aug. 14, 1956 |

UNITED STATES PATENT OFFICE
CERTIFICATION OF CORRECTION

Patent No. 2,973,505                  February 28, 1961

Oddvar M. Johannesen

It is hereby certified that error appears in the above numbered patent requiring correction and that the said Letters Patent should read as corrected below.

In the grant (only), line 1, name of inventor, for "Oddyar M. Johannesen" read -- Oddvar M. Johannesen --; in the printed specification, column 10, line 75, for "Sw...SwO" read -- Sw5...SwO --; column 11, in the table, column 3, line 46 thereof, for "(12, 1S" read -- (12, 1 --; column 13, in the table, column 1 thereof, for the period number "34 to 1" read -- 34 to 81 --; column 19, line 8, for "such" read -- each --.

Signed and sealed this 5th day of September 1961.

(SEAL)
Attest:

ERNEST W. SWIDER                           DAVID L. LADD
Attesting Officer                              Commissioner of Patents